US011117663B2

(12) United States Patent
Cantrell et al.

(10) Patent No.: US 11,117,663 B2
(45) Date of Patent: *Sep. 14, 2021

(54) APPARATUS AND METHOD FOR UNMANNED FLIGHT

(71) Applicant: Walmart Apollo, LLC, Bentonville, AR (US)

(72) Inventors: Robert L. Cantrell, Herndon, VA (US); John P. Thompson, Bentonville, AR (US); David C. Winkle, Bella Vista, AR (US); Michael D. Atchley, Eureka Springs, AR (US); Donald R. High, Noel, MO (US); Todd D. Mattingly, Bentonville, AR (US); John J. O'Brien, Farmington, AR (US); John F. Simon, Pembroke Pines, FL (US)

(73) Assignee: Walmart Apollo, LLC, Bentonville, AR (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/352,694

(22) Filed: Mar. 13, 2019

(65) Prior Publication Data

US 2019/0210725 A1 Jul. 11, 2019

Related U.S. Application Data

(63) Continuation of application No. 15/698,516, filed on Sep. 7, 2017, now Pat. No. 10,273,001.

(Continued)

(51) Int. Cl.
B64C 39/02 (2006.01)
B64C 3/42 (2006.01)
(Continued)

(52) U.S. Cl.
CPC .............. *B64C 39/024* (2013.01); *B64C 3/42* (2013.01); *B64C 3/56* (2013.01); *B64C 33/02* (2013.01);
(Continued)

(58) Field of Classification Search
CPC ........... B64C 39/024; B64C 3/42; B64C 3/56; B64C 33/02; B64C 2201/021;
(Continued)

(56) References Cited

U.S. PATENT DOCUMENTS 3,451,646 A 6/1969 Aarnaes
6,398,157 B1 * 6/2002 Ingram .................... B64C 3/40
244/7 B
(Continued)

FOREIGN PATENT DOCUMENTS

CN 203376646 1/2014
EP 3263445 1/2018
(Continued)

OTHER PUBLICATIONS

Muraoka, Koji, et al.; "Quad Tilt Wing VTOL UAV: Aerodynamic Characteristics and Prototype Flight Test", AIAA Infotech@Aerospace Conference, Apr. 2009, Seattle, Washington, http://www.enu.kz/repository/2009/AIAA-2009-1834.pdf, pp. 1-10.
(Continued)

Primary Examiner — Calvin Cheung
(74) Attorney, Agent, or Firm — Fitch, Even, Tabin & Flannery LLP

(57) ABSTRACT

Systems, apparatuses, and methods are provided herein for unmanned flight optimization. A system for unmanned flight comprises a set of motors configured to provide locomotion to an unmanned aerial vehicle, a set of wings coupled to a body of the unmanned aerial vehicle via an actuator and configured to move relative to the body of the unmanned
(Continued)

aerial vehicle, a sensor system on the unmanned aerial vehicle, and a control circuit. The control circuit being configured to: control the unmanned aerial vehicle, cause the set of motors to lift the unmanned aerial vehicle, detect condition parameters based on the sensor system, determine a position for the set of wings based on the condition parameters, and cause the actuator to move the set of wings to the wing position while the unmanned aerial vehicle is in flight.

19 Claims, 7 Drawing Sheets

Related U.S. Application Data

(60) Provisional application No. 62/385,823, filed on Sep. 9, 2016.

(51) Int. Cl.
    *B64C 3/56*     (2006.01)
    *B64C 33/02*     (2006.01)

(52) U.S. Cl.
    CPC .. *B64C 2201/021* (2013.01); *B64C 2201/022* (2013.01); *B64C 2201/025* (2013.01); *B64C 2201/027* (2013.01); *B64C 2201/102* (2013.01); *B64C 2201/108* (2013.01); *B64C 2201/127* (2013.01); *B64C 2201/128* (2013.01); *B64C 2201/14* (2013.01); *B64C 2201/162* (2013.01)

(58) Field of Classification Search
    CPC ........ B64C 2201/022; B64C 2201/025; B64C 2201/027; B64C 2201/102; B64C 2201/108; B64C 2201/127; B64C 2201/128; B64C 2201/14; B64C 2201/162
    See application file for complete search history.

(56) References Cited

U.S. PATENT DOCUMENTS

| | | |
|---|---|---|
| 6,923,404 B1 | 8/2005 | Liu |
| 7,306,187 B2 | 12/2007 | Lavan |
| 8,366,049 B2 | 2/2013 | Karem |
| 8,376,264 B1 | 2/2013 | Hong |
| 9,315,267 B2 | 4/2016 | Pan |
| 9,334,052 B2 | 5/2016 | Pasko |
| 9,550,577 B1 | 1/2017 | Beckman |
| 9,573,684 B2 | 2/2017 | Kimchi |
| 10,273,001 B2 | 4/2019 | Cantrell |
| 2004/0045204 A1 | 3/2004 | Miano |
| 2005/0014445 A1 | 1/2005 | Fasquel |
| 2006/0111845 A1 | 5/2006 | Forbis |
| 2006/0247967 A1 | 11/2006 | Prusik |
| 2010/0065632 A1 | 3/2010 | Babcock |
| 2010/0198514 A1 | 8/2010 | Miralles |
| 2010/0213309 A1 | 8/2010 | Parks |
| 2011/0001020 A1 | 1/2011 | Forgac |
| 2012/0091284 A1* | 4/2012 | Goodarzi ............... B64C 39/024 244/23 A |
| 2012/0175412 A1 | 7/2012 | Grabiner |
| 2013/0048722 A1 | 2/2013 | Davis |
| 2014/0252091 A1 | 9/2014 | Morse |
| 2014/0339372 A1 | 11/2014 | Dekel |
| 2015/0028155 A1* | 1/2015 | Reiter .................... B64C 3/385 244/39 |
| 2015/0136897 A1 | 5/2015 | Seibel |
| 2015/0277440 A1 | 10/2015 | Kimchi |
| 2016/0129998 A1 | 5/2016 | Welsh |
| 2016/0176502 A1 | 6/2016 | Snook |
| 2016/0196755 A1 | 7/2016 | Navot |
| 2016/0200436 A1 | 7/2016 | North |
| 2016/0257401 A1 | 9/2016 | Buchmueller |
| 2017/0110017 A1 | 4/2017 | Kimchi |
| 2018/0057161 A1* | 3/2018 | Groninga ................ B64C 25/52 |
| 2018/0086445 A1 | 3/2018 | Combs |
| 2018/0222584 A1 | 8/2018 | Dunn |
| 2019/0071174 A1* | 3/2019 | Burigo ................... B64C 3/385 |

FOREIGN PATENT DOCUMENTS

| | | | |
|---|---|---|---|
| IT | 2016 | * 3/2016 | ........... B64C 39/024 |
| WO | 2015161352 | 10/2015 | |
| WO | 2016130994 | 8/2016 | |
| WO | 2016135554 | 9/2016 | |
| WO | 2017131834 | 8/2017 | |
| WO | 2017158417 | 9/2017 | |

OTHER PUBLICATIONS

PCT; App. No. PCT/US2017/063363; International Search Report and Written Opinion dated Feb. 16, 2018.

USPTO; U.S. Appl. No. 15/698,516; Notice of Allowanace dated Dec. 17, 2018.

UKIPO; App. No. GB1903908.0; Examination Report dated Jan. 14, 2021.

* cited by examiner

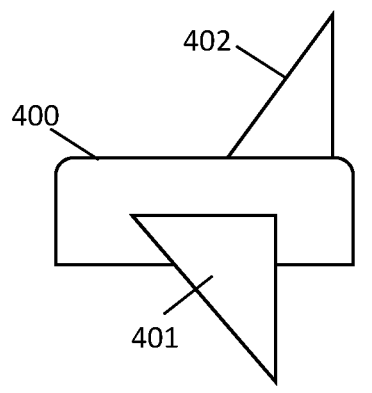 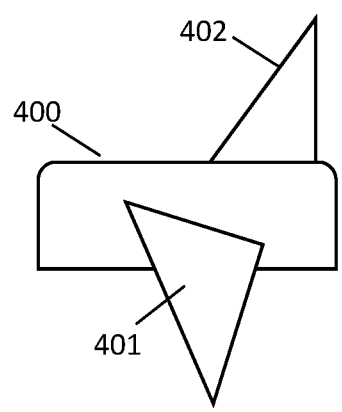 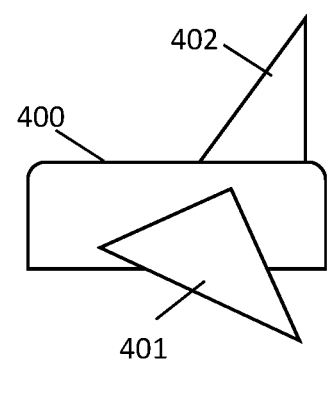
FIG. 4A  FIG. 4B  FIG. 4C
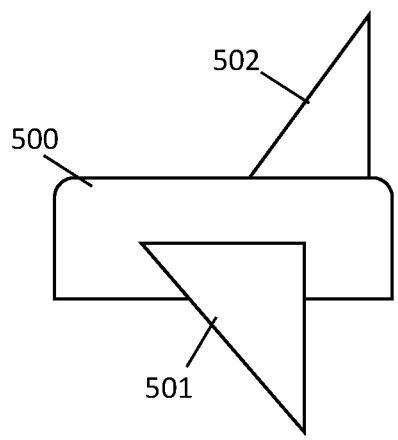 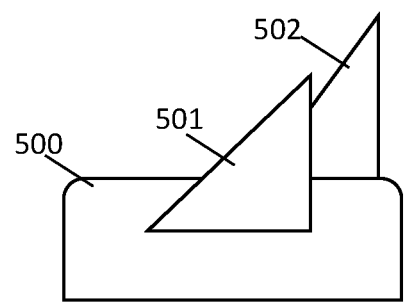
FIG. 5A  FIG. 5B

APPARATUS AND METHOD FOR UNMANNED FLIGHT

CROSS-REFERENCE TO RELATED APPLICATION

This application is a continuation of U.S. application Ser. No. 15/698,516 filed Sep. 7, 2017 and issued as U.S. Pat. No. 1,0273,001 B2 on Apr. 30, 2019, which claims the benefit of the following U.S. Provisional Application No. 62/385,823 filed Sep. 9, 2016, all of which are incorporated herein by reference in their entirety.

TECHNICAL FIELD

This invention relates generally to unmanned aerial systems.

BACKGROUND

An unmanned aerial vehicle (UAV), also referred to as an aerial drone and an unmanned aircraft system (UAS), is an aircraft without a human pilot aboard.

BRIEF DESCRIPTION OF THE DRAWINGS

Disclosed herein are embodiments of apparatuses and methods for unmanned flight optimization. This description includes drawings, wherein:

FIGS. 4A, 4B, and 4C are illustrations of a UAV in accordance with several embodiments;

FIGS. 5A and 5B are illustrations of a UAV in accordance with several embodiments;

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for unmanned flight. In some embodiments, a system for unmanned flight comprises a set of motors configured to provide locomotion to an unmanned aerial vehicle, a set of wings coupled to a body of the unmanned aerial vehicle via an actuator and configured to move relative to the body of the unmanned aerial vehicle, a sensor system on the unmanned aerial vehicle, and a control circuit coupled to the sensor system. The control circuit being configured to: retrieve a task profile for a task assigned to the unmanned aerial vehicle, cause the set of motors to lift the unmanned aerial vehicle, detect condition parameters of the unmanned aerial vehicle based on the sensor system, determine a position for the set of wings based on the task profile and the condition parameters, and cause the actuator to move the set of wings to the wing position while the unmanned aerial vehicle is in flight.

Figure 1:
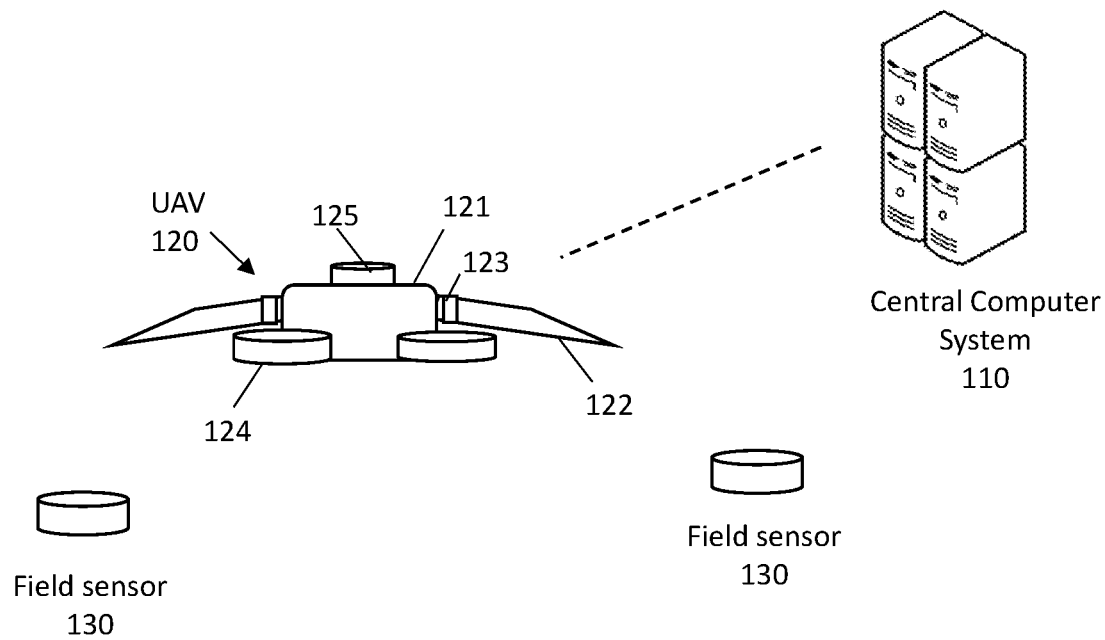
FIG. 1 is a system diagram of a system in accordance with several embodiments.

Referring now to FIG. 1, a system for performing tasks with a UAV according to some embodiments is shown. The system includes a central computer system 110, a UAV 120, and a plurality of field sensors 130.

The central computer system 110 may comprise a control circuit, a central processing unit, a processor, a microprocessor, and the like and may be one or more of a server, a central computing system, a UAV management computer system, a personal computer system, and the like. Generally, the central computer system 110 may comprise any processor-based device configured to communicate with UAVs. In some embodiments, the central computer system 110 may comprise a system that is remote to a task site, a system that is at least partially located at the task site, and/or a cloud-based system. The central computer system 110 may comprise a processor configured to execute computer readable instructions stored on a computer readable storage memory. The central computer system 110 may generally be configured to provide task instructions to the UAV 120. In some embodiments, the central computer system 110 may be configured to determine a flight path and/or flight pattern for the UAV 120. In some embodiments, the central computer system 110 may comprise a flight optimization engine configured to select flight modes and/or flight patterns for one or more UAVs based on condition parameters. In some embodiments, the central computer system 110 may perform one or more steps in the methods and processes described with reference to FIG. 2 herein. Further details of a central computer system 110 according to some embodiment is provided with reference to FIG. 3 herein.

The UAV 120 may comprise an unmanned aerial vehicle configured to perform one or more tasks while in flight. The UAV 120 comprises a body 121, a plurality of wings 122 coupled to the body 121 via actuators 123, a plurality of motors 124, and a sensor system 125. In some embodiments, the UAV 120 may comprise a multicopter configured to hover at and/or near a task premises. In some embodiments, the UAV 120 may comprise a bicopter, a tricopter, a quadcopter, or hexacopter, octocopter, etc. In some embodiments, the UAV 120 may comprise an air chamber (e.g. balloon, blimp, etc.) storing lighter than air gas for providing lift to the UAV 120. In some embodiments, the UAV 120 may comprise a communication device configured to communicate with the central computer system 110 before and/or during flight, a GPS receiver configured to provide geolocation information of the UAV 120, and a control circuit configured to control the navigation and task performance of the UAV 120.

In some embodiments, the UAV 120 may be configured to perform one or more types of tasks. In some embodiments, a UAV task may relate to one or more of agriculture, farming, livestock management, geological survey, scientific study, wildlife study, wildlife management, security surveillance, forestry, marine study, etc. In some embodiments, a task may comprise a data gathering task and/or action task in which UAV 120 acts to affect the environment, animals, and/or persons around it. In some embodiments, tasks may be performed with one or more modular attachments to the UAV 120. In some embodiments, two or more UAVs may be configured to collectively perform a task. Further details of a UAV 120 according to some embodiments is provided with reference to FIG. 3 herein.

The wings 122 may comprise structures configured to move relative to the body 121 of the UAV 120 via the actuator 123 coupling the wings 122 to the body 121. In some embodiments, the wings 122 may be configured to rotate forward and backward on an axis that is perpendicular to the body 121 of the UAV 120 via the actuator. In some embodiments, the wings 122 may be configured to flap up and down to generate lift and/or steer the UAV. For example, the wings 122 may comprise or be similar to the wings of an ornithopter that imitate the flapping wing flight of birds, bats, and/or insects. In some embodiments, the wings 122 may be configured to extend and retract from the sides of the UAV 120. In some embodiments, the wings 122 may comprise one or more flexible membrane supported by a frame structure coupled to the actuator. In some embodiments, the flexible membrane may comprise may thin flexible material such as fabric, nylon, plastic, plastic composite, etc. In some embodiments, the frame structure may comprise a structure similar to bird or bat wing skeletal structure. In some embodiments, the wings 122 may be configured to extend and retract similar to a bat wing. In some embodiments, in the retracted position, the profile of the wings 122 may be significantly decreased to allow the UAV 120 to maneuver similar to a conventional unless multicopter. In some embodiments, in the extend position, the wings 122 may be configured provide lift to the UAV 120. In some embodiments, the wings 122 may allow the UAV 120 glide in the air similar to a glider with or without the propulsion from the motors 124. While two wings are shown, in some embodiments, the UAV 120 may comprise three or more wings. In some embodiments, each wing on the UAV 120 may be configured to be separately extended, retracted, and/or rotated. Examples of the wings on a UAV according to some embodiments are provided with reference to FIGS. 4A-C and 5A-B herein.

The motors 124 comprise powered motors configured to provide locomotion to the UAV 120. In some embodiments, the motors 124 comprises propellers configured to affect air movement around the UAV 120. In some embodiments, the motors 124 may be selectively engaged to control the movement speed and/or direction of the UAV 120. In some embodiments, the motors 124 may comprise motors similar to those on a conventional multicopter and/or airplane. In some embodiments, the motors 124 may be configured to tile and/or rotate relative to the body of the UAV 120. In some embodiments, the speed and/or rotation of the motors 124 may be configured to be separately controlled. Examples of rotatable motors according to some embodiments are provided with reference to FIGS. 6 A-C herein.

The placement of wings 122 and motors 124 in FIG. 1 are provided as an example only. In some embodiments, one or more the wings 122 and motors 124 may be variously configured on the UAV 120 without departing from the spirit of present disclosure. In some embodiments, the view of the UAV 120 in FIG. 1 may comprise a rear or a front view a UAV traveling on a path perpendicular to the plane of the page. In some embodiments, additional motors may be positioned behind the body 121 of the UAV 120 as shown in FIG. 1. In some embodiments, the motors 124 may be positioned on the sides of the body 121, adjacent to the wings 122, and/or under the wings 122. In some embodiments, the body 121 may comprise an aerodynamic body with round edges similar to conventional aircraft. In some embodiments, the body 121 may comprise one or more arms for supporting one or more motors 124 and/or wings 122. In some embodiments, the body 121 may comprise any shape without departing from the spirit of the present disclosure. In some embodiments, the UAV 120 may further include equipment, sensor, and/or cargo. In some embodiments, the UAV 120 may further comprise one or more of a tail and a sail coupled to the body 121 of the UAV 120 configured to provide stability to the unmanned aerial vehicle. In some embodiments, the UAV may further comprise landing gears configured to assist in the takeoff of the UAV with the wings extended. For example, the UAV may be configured to take off similar to a fixed-wing plane with the landing gears. Examples of several UAV configurations according to some embodiments are provided with reference to FIGS. 4A-C, 5A-B, and 6 A-C herein The sensor system 125 may comprise one or more sensors for capturing data from the environment of the UAV 120. In some embodiments, the sensor system 125 comprises one or more environmental sensors such as a wind sensor, a light sensor, an image sensor, a visibility sensor, a weather sensor, a barometric pressure sensor, a range sensor, a humidity sensor, a sound sensor, a thermal image sensor, a night vision camera, etc. In some embodiments, the sensor system 125 may further be configured to collect data specified by one or more tasks assigned to the UAV 120. In some embodiments, the UAV 120 may include other flight sensors such as optical sensors and radars for detecting obstacles in the path of flight to avoid collisions. In some embodiments, the sensor system 125 may comprise one or more detachable modular components comprising one or more sensors. In some embodiments, the sensor system 125 may comprise one or more devices attached to the UAV's body through one or more attachment means and/or may be integrated with the body of the UAV 120. In some embodiments, one or more sensors may be coupled to an actuator that pivots and/or rotates the sensor relative to the body of the UAV 120. While the sensor system 125 is shown to be attached to the top of the UAV 120 in FIG. 1, in some embodiments, sensors may be attached to different portions of the UAV (e.g. bottom, wing, landing gear, etc.). In some embodiments, the sensor system 125 may comprise a standalone device that may operate independently when detached from the UAV 120. In some embodiments, the UAV 120 may be configured to drop one or more detachable sensor devices to the ground for data gathering.

The field sensor 130 may comprise stationary sensors positioned in the field of operation of the UAV 120. In some embodiments, the field sensors 130 may comprise one or more of a wind sensor, a light sensor, an image sensor, a visibility sensor, a weather sensor, a barometric pressure sensor, a range sensor, a humidity sensor, a sound sensor, a thermal image sensor, a night vision camera, etc. In some embodiments, a field sensor 130 may be configured to communicate directly with UAVs via a wireless communication device. In some embodiments, a field sensor 130 may be configured to transmit sensor reading to a separate communication stations and/or the central computer system 110. In some embodiments, the data collected by the field sensors 130 may be used by the central computer system 110 and/or the UAV 120 to determine the optimal flight pattern of the UAV 120. For example, data from field sensors may be used to plot out a wind direction and/or speed map in the field to allow the UAV 120 and/or the central computer system 110 to anticipate wind condition changes in the UAV's path of travel. In some embodiments, one or more of the field sensors 130 may be initially dropped by a UAV. In some embodiments, a field sensor 130 may comprise a power source such as one or more of a battery and a solar panel.

In some embodiments, the system may further comprise communication stations in the field that are configured to wirelessly relays information between one or more of the central computer system 110, UAVs 120, and field sensors 130. In some embodiments, a communication station may comprise a control circuit, a long range transceiver, and/or short range data transceiver. In some embodiments, a plurality of communication stations may collectively form an area wireless network for various components of the system to exchange information. In some embodiments, one or more communication stations may comprise a radio frequency tower in the field. In some embodiments, one or more communication stations may comprise UAVs and/or balloons configured to hover, float, and/or travel in the air above the field. In some embodiments, an UAV may be assigned the task of being a communication station and they system may determine a flight pattern for the UAV based on task requirements of a communication station.

While only one UAV 120 is shown in FIG. 1, in some embodiments, the central computer system 110 may communicate with and/or provide task instructions to a plurality of UAVs. In some embodiments, two or more UAVs may be deployed at a task site to perform complimentary and/or parallel tasks simultaneously and/or in shifts. In some embodiments, the UAVs may be configured to communicate directly with each other and/or via a communication station or other communication devices in the field. In some embodiments, the central computer system 110 may assign tasks to UAVs based on UAV statuses such as one or more of the locations of UAVs, locations of task targets, other tasks already assigned to UAVs, capabilities of each UAV, fuel level of each UAV, current attachments of each UAV, etc.

Figure 2:
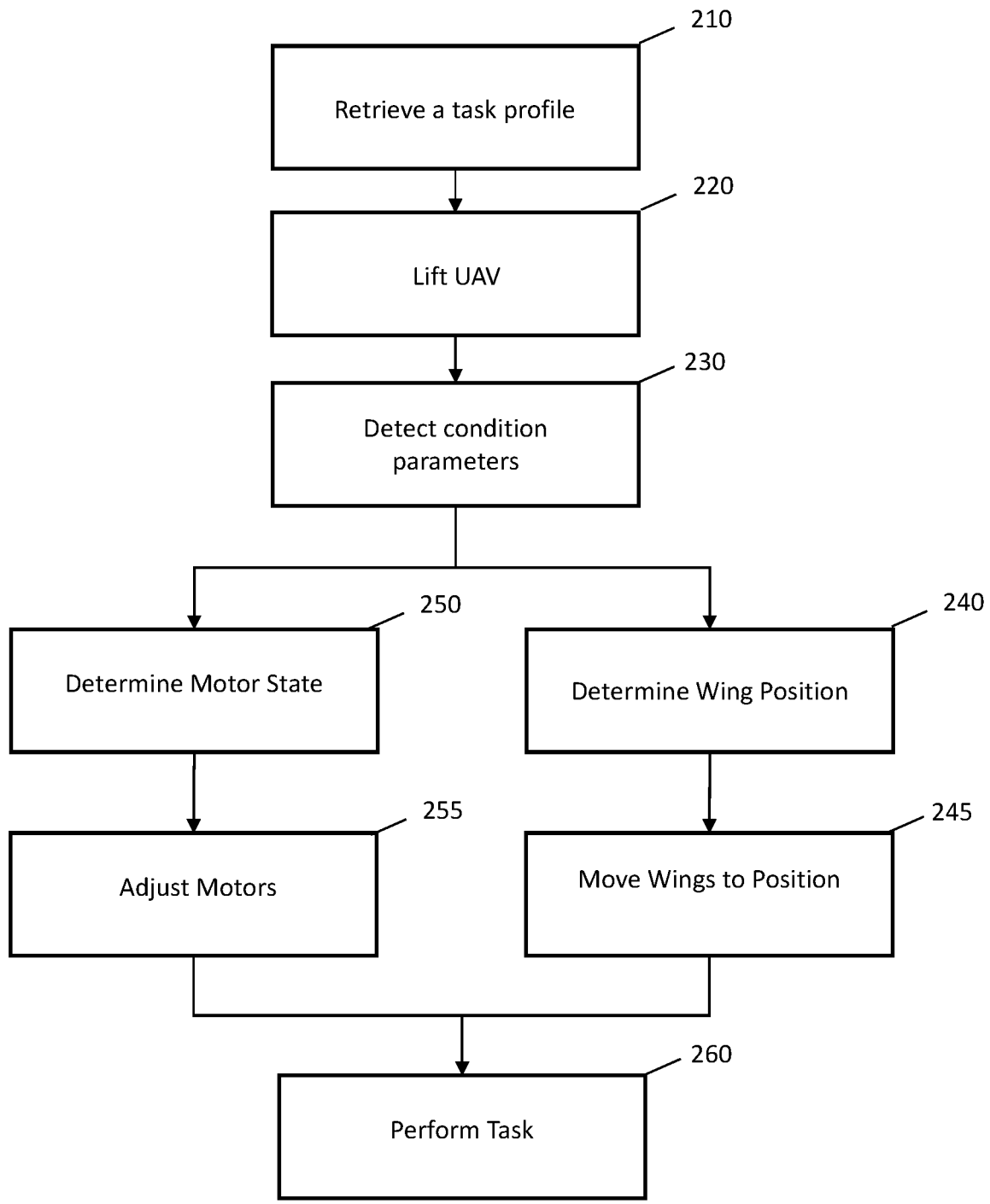
FIG. 2 is a flow diagram of a method in accordance with several embodiments.

Referring now to FIG. 2, a method of unmanned flight is shown. In some embodiments, the steps shown in FIG. 2 may be performed by a processor-based device, such as the central computer system 110, the controls of the UAV 120 described with reference to FIG. 1, the control circuit 314 and/or the control circuit 321 described with reference to FIG. 3 below. In some embodiments, the steps may be performed by one or more of a processor of a UAV, a processor of a central computer system, a processor of a docking station, and/or a processor device on the ground of the UAV task site.

In step 210, the system retrieves a task profile for a task assigned to a UAV. In some embodiments, the task may be assigned by a central computer system managing one or more UAVs. In some embodiments, the task and/or task profile may be preloaded on the UAV prior to the UAV's deployment to a site. In some embodiments, the task profile may be retrieved from a task profile database, the UAV's local memory device, via a wired or wireless data connection, via a docking station, and/or from another processor-based device. In some embodiments, a task profile may comprise one or more requirements for task accuracy, acceptable speed, acceptable altitude, acceptable flight zone, acceptable distance from a target location, acceptable risk, data to be collected, action to be performed, and required modular attachments. In some embodiments, multiple task profiles for tasks assigned to a UAV may be retrieved in step 220. In some embodiments, the task profile may be retrieved from the task profile database 330 described with reference to FIG. 3 herein.

In step 220, the system causes a set of motors to lift the UAV. In some embodiments, the system may further determine a path and/or destination for the UAV based on the task profile. In some embodiments, the path and/or destination of the UAV may further be determined based on conditional parameters. In some embodiments, the UAV may be in flight in step 210, and the motors may continue to provide locomotion to the UAV in step 220. In some embodiments, the system may further be configured to determine a launch mode based on condition parameters detected by on broad and/or remote sensors. In some embodiments, the system may be configured to select between a runway take-off and a vertical take off for the UAV. In some embodiments, during a runway take-off, the wings of the UAV may be extended and the motors tilted backwards similar to a conventional fixed wing plane. In some embodiments, during a vertical takeoff, the UAV's wings may be retracted and the motors may be pointed towards the ground similar to a conventional multicopter. In some embodiments, the take-off mode may be selected based on factors such as wind speed, wind direction, clearance, nearby objects, runway availability, load weight, etc. For example, for heavier loads, the system may determine that better fuel efficiency may be achieved with the runway takeoff mode.

In step 230, the system detects condition parameters. In some embodiments, condition parameters may be detected by a sensor system on the UAV. In some embodiments, condition parameters may comprise one or more of: wind speed, wind direction, air pressure, visibility, lighting condition, precipitation, weather condition, ground condition, distance to a charging station, and locations of one or more other aerial vehicles. In some embodiments, the sensor system may comprise one or more environmental sensors such as a wind sensor, a light sensor, an image sensor, a visibility sensor, a weather sensor, a barometric pressure sensor, a range sensor, a humidity sensor, a sound sensor, a thermal image sensor, a night vision camera, etc. In some embodiments, the sensor system on the UAV may comprise a wireless data transceiver for receiving condition parameters from a remote data source. In some embodiments, the condition parameters may further comprise information received from one or more of: a stationary sensor, a weather reporting service, an air traffic control signal, and one or more other aerial vehicles. In some embodiments, the condition parameters may comprise data collected by field sensors 130 and/or the central computer system 110 described with reference to FIG. 1 or similar devices. In some embodiments, condition parameters collected by a UAV may be shared with multiple UAVs in the system. In some embodiments, condition parameters may comprise condition parameters associated with different areas of the UAV's field of operation. In some embodiments, step 230 may be performed while the UAV is in flight.

In step 240, the system determines a wing position for the UAV. In some embodiments, the wing position may be determined based on the task profile retrieved in step 210 and the condition parameters detected in step 230. In some embodiments, the wing position may comprise a wing rotation angle. In some embodiments, the wing position may comprise one or more of an extended position, partially extended position, and a retracted position. In some embodiments, one or more wings on a UAV may be separately set to different positions. In some embodiments, the system may first determine a flight pattern and/or path and the position of the wings may be adjusted to cause the wind to push the UAV in its intended direction/path of travel based on the condition parameters. In some embodiments, the angle of the wings may be adjusted to reduce wind resistance in the UAV's direction of travel. In some embodiments, the wing position may be determined based on satisfying requirements of the task profile while minimizing power consumption of the unmanned aerial vehicle. In some embodiments, wing position may be determined further based on one or more of a fuel level, attached equipment type, flight capability, other assigned tasks of the unmanned aerial vehicle, and tasks assigned to a system of manned or unmanned vehicles.

In some embodiments, the system may determine whether the requirements of the task profile could be met in various flight pattern and/or wing positions. For example, the system may determine whether extending the wings of the UAV may cause the UAV to glide outside of the target area. In some embodiments, the system may be configured to estimate the energy cost for flying the UAV in different wing positions based on condition parameters and/or the task profile. For example, if the task requires a low speed flight, the system may determine that under the current condition parameters, whether using the motors or wing flaps to maintain altitude is more energy efficient. In some embodiments, the current wind speed and direction, the length of flight required, and the equipment to be carried on the UAV may be factors in determining the cost of flying the UAV. For example, in tailwind conditions, extending the wings may decrease fuel consumption while in headwind conditions, flying with wings retracted may be more energy efficient. In some embodiments, the system may be configured to estimate the risk associated with different wing positions based on condition parameters. In some embodiments, the current wind speed, the current weather, the presence of nearby animals and/or humans may be factors in determining the risk of different wing positions. For example, in turbulent wind conditions, retracting the wings may reduce risk. In another example, when the UAV is in a free fall, extending the wings may reduce the impact of the fall. In some embodiments, one or more positions of the wings may be selected to affect the flight pattern of the UAV and/or reduce the energy consumption of the motors.

In some embodiments, the system may separately evaluate each of the requirements in the task profile based on the condition parameters detected by the sensor system to determine whether each requirement could be met with a more energy efficient flight mode. In some embodiments, the UAV may be configured to enter a glide mode in which the one or more motors are shut off or slowed down and the UAV is kept in the air mainly from the lift provided by the wings. In some embodiments, in step 240, the system may determine whether the wings should be set into a position to enter a glide mode based on the task profile and/or the condition parameters. For example, a task profile may require visibility of at least 30% of a plot of land and the system may determine whether the required visibility may be achieved by gliding the UAV. In another example, the task profile may require that the UAV maintain a set distance from a stationary or moving task target and the system may determine whether the required distance may be maintained with the UAV in glide mode. In some embodiments, task requirements may be weighed against energy savings and/or potential risk in determining whether to glide the UAV. For example, the amount of time saved from performing the task with motor propulsion may be weighed against the amount of energy saved from performing the task while gliding at least part of the time. In some embodiments, one or more requirements of the task profile may comprise cost and benefit factors that may be weighed against each other. In some embodiments, the system may glide the UAV if the cost saving (e.g. reduce energy cost) outweighs the cost to task performance (e.g. decreased speed, decreased accuracy, effectiveness, etc.). In some embodiments, the UAV may be configured to enter glide mode whenever the condition permits, unless at least one requirement of the task profile cannot be met by gliding the UAV. In some embodiments, if the risk to the UAV exceeds a set threshold, the system may engage the motors and/or land the UAV regardless of the requirements of the task profile. In some embodiments, if at least one task assigned to the UAV requires full engagement of the UAV's motors, the system may cause the UAV to fly and simultaneously perform one or more tasks.

In step 245, the system moves the wings to the position determined in step 240. In some embodiments, the wings may be adjusted with actuators coupling the wings to the body of the UAV. In some embodiments, step 245 comprises extending the wings, retracting the wings, or partially extending or retracting the wings. In some embodiments, step 245 comprises rotating one or more wings to a selected angle. In some embodiments, step 245 comprises raising or lowing the tip of the wing in a flapping motion relative to the body of the UAV.

In step 250, the system determines a motor state for the UAV. In some embodiments, the motor state may be determined based on the task profile retrieved in step 210 and/or the condition parameters detected in step 230. In some embodiments, the motor state may be determine separately for each of the two or more motors on the UAV. In some embodiments, the motor state may comprise on, off, and/or a specified speed. In some embodiments, the system may be configured to reduce the amount of power that needs to be supplied to the motor to perform the task. For example, if the UAV may enter a glide mode with motors turned off and still perform the assigned task(s), the system may cause the UAV to enter glide mode and turn off the motors. In some embodiments, the state of the motors may be determined similar to a conventional multicopter to control the speed and/or direction of the UAV. In some embodiments, the motor state may comprise a rotation of the motor and the UAV may comprise a set of motors configured to rotate relative to the body of the UAV to an angle determine based on one or more of the task profile and/or the condition parameters. In some embodiments, the rotation of the motors may be determined separately for each motor on the UAV.

In step 255, the system adjusts the motors on the UAV based on the motor state determined in step 250. In some embodiments, in step 255, the system may selectively turn the motors on or off, and/or adjust the speed of one or more motors. In some embodiments, in step 255, the system may cause one or more motors to rotate the change the direction of the motor's propulsion.

In some embodiments, the steps 250 and 240 may be combined as a single step. In some embodiments, steps 250 and 240 may be performed by an optimization engine at the central computer system and/or onboard the UAV. In some embodiments, the system may determine a flight pattern and/or path for the UAV and adjust the motor and the wings to follow the pattern and/or path based on the environmental parameters. In some embodiments, the system may determine a UAV operating mode (e.g. glide, climb, forward flight, vertical lift, etc.) based on the task profile and condition parameters and determine the motor state and/or the wing position based on the selected operating mode. In some embodiments, in a glide mode, the system may turn off the motors and extend the wings. During a glide mode, the system may further rotate the wings with the based on wind condition. In some embodiments, during a glide mode, one or more motors may be selectively engaged to affect the direction and/or speed of the UAV. In some embodiments, during a climb mode, the motors may be turned on and rotated to an angle and the wings may be extended and rotated based on the wind direction to provide additional lift. In some embodiments, during a forward flight mode, the motors may be turned on and angled straight backwards and the wings may be extended and generally positioned to be parallel with the direction of flight. In some embodiments, during a vertical lift mode, the wings may be retracted with the motors may point directly towards the ground. In some embodiments, the system may be configured to select a flight mode from a plurality of flight modes based on satisfying requirements of the task profile while minimizing power consumption of the UAV. For example, the system may determine whether a low power consumption mode (e.g. gliding) would meet the requirements of the task profile (e.g. staying within specified altitude, staying within permitted area, maintaining sufficient speed, etc.). If so, the system may place the UAV into the low power mode. If not, the system may determine whether the next lowest power consumption mode would meet the task requirements and so forth.

In some embodiments, the system may be configured to determine a flight pattern for the UAV based on the conditional parameters and the task profile. In some embodiments, a flight pattern may comprise a sequence of two or more flight modes that could satisfy task requirement while conserving energy. For example, for a UAV traveling between two location, the system may determine that, instead of flying at a constant altitude, the energy consumption of the task may be reduced if the UAV climbs in altitude for the first half of the trip and glide with motors turned off for the second half of the trip. In some embodiments, a flight pattern of a UAV may comprise multiple climbing portions and gliding portions. In some embodiments, the flight pattern may be determined based on condition parameters associated with different areas of a path detected by field sensors and/or other UAVs. An example of a flight pattern is provided with reference to FIG. 7 herein.

In some embodiments, the system may be configured to cause a plurality of UAVs with similar flight paths to form a UAV flock. UAVs in a flock may fly in a formation that allows trailing UAVs to ride the tail wing of the leading UAVs to conserve energy. In some embodiments, a flock of UAVs may be configured to fly in a V-shaped grouping similar to geese or birds.

In step 260, the system causes the UAV to perform one or more tasks assigned to the UAV. In some embodiments, tasks may continue to be perform as the process returns to step 230. For example, as a UAV travels to a destination, collects data, and/or deters pest in a field, the wing positions and/or the motor state of the UAV may be constantly adjusted based on the condition parameters detected in step 230. In some embodiments, a UAV may comprise fixed wings and omit step 240 and 245. In some embodiments, a UAV may comprise fixed motors and the motor states in step 250 consist of only the speed of the one or more motors.

After step 260, the system may detect for the completion of a task. Once all tasks are completed and/or if the UAV needs recharging and/or serving, the system may cause the UAV to return to a deployment, service, and/or docking location. In some embodiments, the return flight may comprise a task, and the wings and/or motors of the UAV may be controlled during a return flight similar to steps 230, 240, 245, 250, and 255. In some embodiments, after step 260, the system may further be configured to select a landing mode based on condition parameters detected by on broad and/or remote sensors. In some embodiments, the system may be configured to select between a runway landing and a vertical landing for the UAV. In some embodiments, during a runway landing, the wings of the UAV may be extended similar to a conventional fixed wing plane. In some embodiments, during a vertical landing, the UAV's motors may be pointed towards the ground similar to a conventional multicopter. In some embodiments, the landing mode may be selected based on factors such as wind speed, wind direction, clearance, nearby objects, runway availability, load weight, etc.

In some embodiments, the control circuit onboard the UAV may be configured to perform one or more of the steps 210-260 with or without communicating with a remote central computer system. In some embodiments, the UAV may be configured to perform steps 220-260 autonomously.

Figure 3:
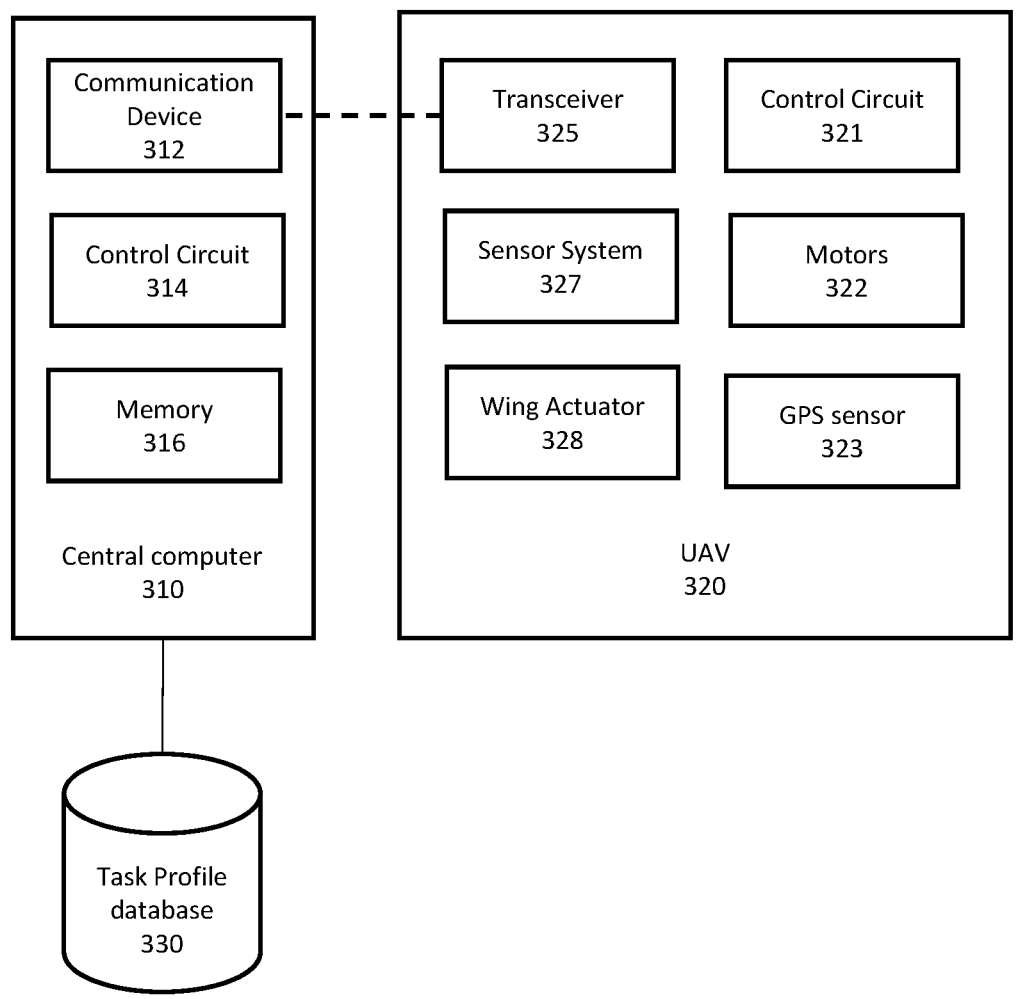
FIG. 3 is a block diagram of a system in accordance with several embodiments.

Referring now to FIG. 3, a block diagram of a system for unmanned flight optimization is shown. The system includes a central computer system 310, a UAV 320, and a task profile database 330.

The central computer system 310 comprises a communication device 312, a control circuit 314, and a memory 316. The central computer system 310 may comprise one or more of a server, a central computing system, a UAV management computer system, and the like. In some embodiments, the central computer system 310 may comprise the central computer system 110 described with reference to FIG. 1 or a similar device. In some embodiments, the central computer system 310 may comprise a system of two or more processor-based devices. The control circuit 314 may comprise a processor, a microprocessor, and the like and may be configured to execute computer readable instructions stored on a computer readable storage memory 316, The computer readable storage memory 316 may comprise volatile and/or non-volatile memory and have stored upon it a set of computer readable instructions which, when executed by the control circuit 314, cause the system to manage tasks carried out by UAVs 320. In some embodiments, the control circuit 314 may further be configured to determine a flight pattern for the UAV 320 based on a task profile and condition parameters. In some embodiments, the computer executable instructions may cause the control circuit 314 of the central computer system 310 to perform one or more steps described with reference to FIG. 2 herein.

The central computer system 310 may be coupled to a task profile database 330 via a wired and/or wireless communication channel. In some embodiments, the task profile database 330 may be at least partially implemented with the memory 316 of the central computer system 310. The task profile database 330 may have stored on it, a plurality of task profiles associated with different types of tasks and/or task locations. In some embodiments, task profiles may comprise one or more requirements for task accuracy, acceptable speed, acceptable altitude, acceptable flight zone, acceptable distance from a target location, acceptable risk, data to be collected, action to be performed, and required modular attachments. In some embodiments, the requirements may correspond to one or more condition parameters comprising one or more of: wind speed, wind direction, air pressure, visibility, lighting condition, precipitation, weather condition, ground condition, distance to a charging station, and locations of one or more other aerial vehicles. In some embodiments, one or more tasks in the task profile database 330 may specify a flight pattern and/or one or more flight modes for the UAV. In some embodiments, one or more tasks in the task profile database 330 may be performed with one or more operating modes and/or patterns if the requirements of the task can be met. In some embodiments, the modes and/or patterns may be selected by weighting the cost (e.g. energy cost, etc.) against the benefits (e.g. increase speed, increase accuracy, reduced risk, etc.) of each mode and/or flight pattern for the task. In some embodiments, factors for calculating cost and benefit of flight modes and/or patterns may be part of the task profile and/or separately stored. In some embodiments, the task profile may specify the weighting factors and/or thresholds for different types of costs and benefits relating to the task.

In some embodiments, the central computer system 310 may further be coupled to or include a UAV database configured to record statuses of UAVs managed by the central computer system 310. States of UAVs may comprise one or more of each UAV's location, assigned task(s), motor state, wing position, sensor reading, current attachments, capabilities, and/or fuel level. In some embodiments, the central computer system 310 may use the UAV database to assign new tasks, provide task instructions to UAVs, and coordinate a system of UAVs at a task site.

The UAV 320 may comprise an unmanned aerial vehicle configured to travel in a field to perform a variety of tasks. In some embodiments, the UAV 320 may comprise a multicopter configured to hover at or near a target location and/or object. For example, the UAV 320 may comprise a bicopter, a tricopter, a quadcopter, or hexacopter, octocopter, etc. In some embodiments, the UAV 320 may comprise an air chamber (e.g. balloon, blimp, etc.) storing lighter than air gas for providing lift to the UAV 320. In some embodiments, the UAV 320 may comprise the UAV 120 described with reference to FIG. 1 or a similar device. The UAV 320 comprises a control circuit 321, motors 322, a GPS sensor 323, a transceiver 325, a sensor system 327, and a wing actuator 328 coupling wings to the body of the UAV 120.

The control circuit 321 may comprise one or more of a processor, a microprocessor, a microcontroller, and the like. The control circuit 321 may be communicatively coupled to one or more of the motors 322, the GPS sensor 323, the transceiver 325, the sensor system 327, and the wing actuator 328. Generally, the control circuit 321 may be configured to navigate the UAV 320 and cause the UAV 320 to perform tasks. In some embodiments, the control circuit 321 may be configured to determine one or more of a flight mode, a flight pattern, a wing position, and a motor state based on a task profile and/or condition parameters. In some embodiments, the control circuit 321 may be configured to adjust the wing position and/or motor state of the UAV 320 based on instructions received from the central computer system 310.

The motors 322 may comprise motors that control one or more of a speed, direction, and/or orientation of one or more propellers on the UAV 320. The motors 322 may be configured to be controlled by the control circuit 321 to lift and steer the UAV 320 in designated directions. In some embodiments, the motors 322 may be configured to pivot and/or rotate relative to the body of the UAV 320 to provide propulsion in different directions. The GPS sensor 323 may be configured to provide GPS coordinate to the control circuit 321 for navigation. In some embodiments, the UAV 320 may further include an altimeter for providing altitude information to the control circuit 321 for navigation.

The transceiver 325 may comprise one or more of a mobile data network transceiver, a satellite network transceiver, a WiMax transceiver, a Wi-Fi transceiver, a Bluetooth transceiver, a RFID reader, and the like. In some embodiments, the transceiver 325 may be configured to allow the control circuit 321 to communicate with the central computer system 310, another UAV, a docking station, and/or a deployed sensor device. In some embodiments, the transceiver 325 may maintain at least periodic communication with the central computer system 310 while the UAV 320 travels and performs tasks. In some embodiments, the UAV 320 may be configured to autonomously travel and perform tasks for extended periods of time without communicating with a remote system.

The sensor system 327 may comprise one or more navigation and/or data collection sensors. In some embodiments, the sensor system 327 may comprise one or more sensors for capturing data around the UAV 320. In some embodiments, the sensor system 327 may comprise one or more environmental sensors such as a wind sensor, a light sensor, an optical sensor, a visibility sensor, a weather sensor, a barometric pressure sensor, a range sensor, a humidity sensor, a sound sensor, a thermal image sensor, a night vision camera, etc. In some embodiments, the sensor system 327 may be configured to collect data specified by one or more tasks assigned to the UAV 320. In some embodiments, the sensor system 327 may include other flight sensors such as optical sensors and radars for detecting obstacles in the path of flight to avoid collisions. In some embodiments, the sensor system 327 may comprise one or more detachable modular components comprising one or more sensors. In some embodiments, the sensor system 327 may comprise one or more devices attached to the UAV's body through one or more attachment means and/or may be integrated with the body of the UAV 320. In some embodiments, the UAV 320 may be configured to deploy one or more detachable sensor device at a task site for data gathering.

The wing actuator 328 may comprise mechanical and electrical components for changing the position of the wings of the UAV 320. In some embodiments, the wing actuator 328 may be configured to individually affect the position of one or more wings. In some embodiments, the wings of the UAV 320 may comprises one or more flexible membranes supported by a frame structure coupled to the wing actuator 328. In some embodiments, the wing actuator 328 may be configured to extend or retract a frame of the wing to cause the wings to extend or retract. In some embodiments, the actuator 328 may be configured to rotate the wing on an axis perpendicular to the body of the UAV. In some embodiments, the wing actuator 328 may be configured to rotate the entire wing on a pivot point connecting the wing to the body of the UAV 320. For example, the actuator 328 may cause the trailing edge of a wing to raise or lower relative the leading edge of the wing via a pivot point coupling the wing to the body of the UAV 320. In some embodiments, the actuator 328 may be configured to flap the entire wing up and down to approximate the wing flapping motion of birds and/or insects. For example, the actuator 328 may cause the tip of a wing (e.g. point of the wing furthest away from the body of the UAV) to raise and/or lower relative to the body of the UAV 320 via a pivot point coupling the wing and the body of the UAV 320. In some embodiments, the pivot point of the wing may be located at any point along the edge of the wing adjacent to the body of the UAV 320, between the leading edge and the trailing edge. Examples of the wings on a UAV according to some embodiments are provided with reference to FIGS. 4A-C and 5A-B herein. In some embodiments, the UAV 320 may further comprise a power source such as a rechargeable battery, a replaceable battery, a fuel cell, a fuel tank, solar cells, etc.

In some embodiments, the system may further comprise one or more field sensors. A field sensor may comprise a stationary sensor positioned in the field of operation of the UAV 320. In some embodiments, the field sensors may comprise one or more of a wind sensor, a light sensor, an image sensor, a visibility sensor, a weather sensor, a barometric pressure sensor, a range sensor, a humidity sensor, a sound sensor, a thermal image sensor, a night vision camera, etc. In some embodiments, the field sensors may be configured to communicate directly with UAVs via the transceiver 325. In some embodiments, the field sensor may be configured to transmit sensor reading to a separate communication stations and/or the central computer system 310. In some embodiments, the data collected by the field sensor system may be used by the central computer system 310 and/or the UAV 320 to determine the flight pattern of the UAV 320. In some embodiments, one or more of the field sensors may be initially deployed onto the field by a UAV.

In some embodiments, the system may further comprise communication stations in the field that are configured to wirelessly relays information between one or more of the central computer system 310, UAVs 320, and field sensors. In some embodiments, a communication station may comprise a control circuit and a long range and/or short range data transceiver. In some embodiments, a plurality of communication stations may collectively form an area wireless network for different components of the system to exchange information. In some embodiments, one or more communication stations may comprise UAVs and/or balloons.

While only one UAV 320 is shown in FIG. 3, in some embodiments, the central computer system 310 may communicate with and/or control a plurality of UAVs. In some embodiments, the central computer system 310 may coordinate the task performances of two or more UAVs deployed to the same task site. For example, two or more UAVs may collect data from different angles and locations to obtain a complete data set for an area. In some embodiments, two or more UAVs may perform tasks in shifts. In some embodiments, the system may be configured to cause a plurality of UAVs with similar flight paths to form a UAV flock. UAVs in a flock may fly in a formation that allows trailing UAVs to ride the tail wing of the leading UAVs to conserve energy.

Referring now to FIGS. 4 A-C, illustrations of a UAV as configured according to some embodiments is shown. The UAV shown in FIGS. 4A-C comprises a body 400, a wing 401, and a sail 402. In some embodiments, a second wing mirroring the first wing 401 may be positioned on the opposite side of the UAV body 400. In some embodiments, the wings on the UAV may be tilted to different angles to cause the UAV to turn left or right.

In some embodiments, the wing 401 of the UAV is configured to rotate about an axis perpendicular to the body of the UAV. In some embodiments, the wing 401 may be coupled to the body 400 of the UAV via a wing actuator at the base of the wing 401. In FIG. 4A, the wing 401 is generally positioned to be parallel to the UAV's body. In some embodiments, the wing position shown in FIG. 4A reduces the wind resistance and provides lift when the UAV is traveling forward. In FIG. 4B, the leading edge of the wing is tilted upwards relative to the trailing edge of the wing. In some embodiments, with the wing position shown in FIG. 4B, a headwind may provide additional lift and a downdraft may provide a forward push on the UAV. In FIG. 4C, the leading edge of the wing is tilted downwards relative to the trailing edge of the wing. In some embodiments, with the wing position shown in FIG. 4C, a tailwind and/or an updraft may provide additional forward push on the UAV. In some embodiments, the wing position shown in FIG. 4C may cause a gradual dip in altitude. In some embodiments, the sail 402 is configured to provide stability to the UAV as the UAV travels forward. In some embodiments, a UAV may comprise motors and/or other components that are omitted in the illustrations shown in FIGS. 4A-C for simplicity and clarity.

Referring now to FIGS. 5 A-B, illustrations of a UAV as configured according to some embodiments is shown. The UAV shown in FIGS. 5A-B comprises a body 500, a wing 501, and a sail 502. In some embodiments, a second wing mirroring the first wing 501 may be positioned on the opposite side of the UAV body 500. In some embodiments, the wing 501 of the UAV is configured to flap up and down relative to the body of the 500 via an actuator as the base of the wing 501. In FIG. 5A, the wing 501 lowered. In FIG. 5B, the wing 501 is pivoted up with the tip of the wing raised relative to the body 500. In some embodiments, the wing 501 may comprise flexible material configured to bend downward and partially retract as the wing is raised, and extend as the wing is lowered. In some embodiments, the UAV may be configured to rapidly alternate between the wing positions shown in FIGS. 5A and 5B to form a flapping motion similar to the flapping wings of birds, bats, and/or insects. In some embodiments, the range and/or speed of the flapping motions of each wing on the UAV may be controlled to control the flight direction of the UAV. In some embodiments, the wing 501 may further be rotated to affect the direction of the UAV. In some embodiments, the sail 502 is configured to provide stability to the UAV as the UAV travels forward. In some embodiments, a UAV may comprise motors and other components that are omitted in the illustrations shown in FIGS. 5A-B for simplicity and clarity.

Figure 6A:
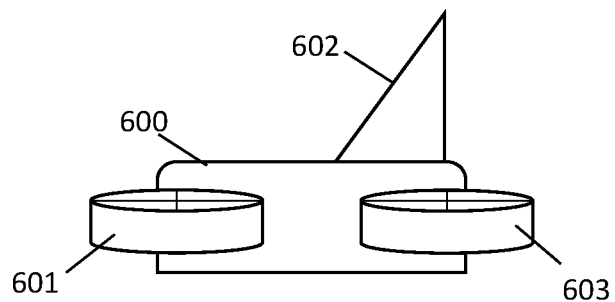
FIGS. 6A, 6B, and 6C are illustrations of a UAV in accordance with several embodiments.
Figure 6B:
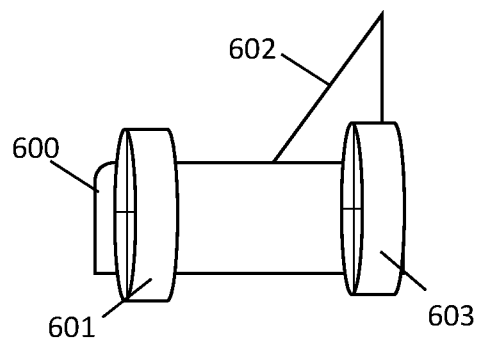
Figure 6C:
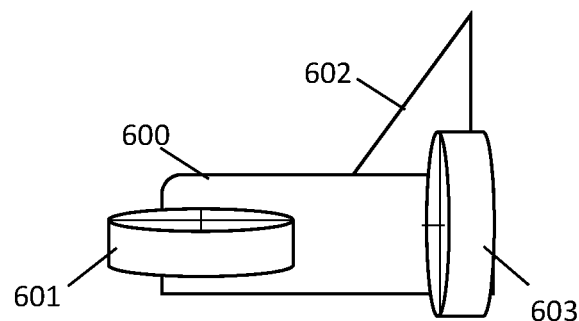

Referring now to FIGS. 6 A-C, illustrations of a UAV as configured according to some embodiments is shown. The UAV shown in FIGS. 6A-C comprises a body 600, a first motor 601, a second motor 603, and a sail 602. In some embodiments, additional motors may be positioned behind the body 600 of the UAV. In FIG. 6A, the first motor 601 and the second motor 603 are both pointed downwards to provide vertical lift to the UAV. In some embodiments, in the motor position shown in FIG. 6A, the UAV may operate similarly to a conventional multicopter. In FIG. 6B, the first motor 601 and the second motor 603 are rotated to point backward. In some embodiments, the motor position in FIG. 6B provides forward propulsion to the UAV. In some embodiments, the motor position shown in FIG. 6B and a set of extended wings attached to the body 600 may be configured to operate similarly to a traditional airplane. In FIG. 6C, the first motor 601 is rotated to point downward while the second motor 603 is rotated to point backward. In some embodiments, in FIG. 6C, the first motor 601 may be configured to provide lift while the second motor 603 may be configured to provide forward propulsion. In some embodiments, the speed of the first motor 601 and the second motor 603 may be separately adjusted to affect the flight path of the UAV. For example, if a sharp vertical lift is desired, the first motor 601 may be driven at a high speed as compared to the second motor 603. In some embodiments, the sail 602 is configured to provide stability to the UAV as the UAV travels forward. In some embodiments, a UAV may comprise wings and other components that are omitted in the illustrations shown in FIGS. 6A-B for simplicity and clarity.

Figure 7:
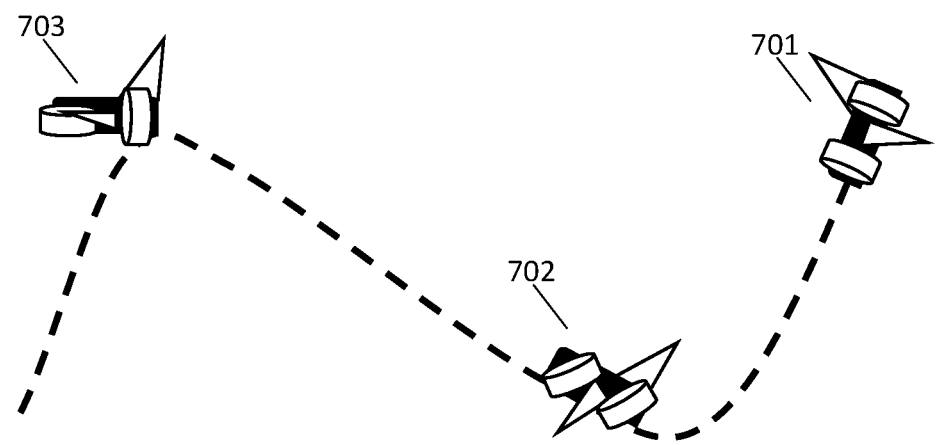
FIG. 7 is an illustration of a flight pattern in accordance with several embodiments.

Referring now to FIG. 7, an illustration of a flight pattern is shown. In stage 701, the UAV points the motors backward and rotates the wings forward to cause the UAV to dip in altitude while traveling forward. In some embodiments, in stage 701, the motors may be turned off or slowed down and the UAV glides at least partially with the wind. In stage 702, the wings and the motors are rotated to provide lift to the UAV. In some embodiments, the UAV may use the acceleration from the drop from stage 701 to at least partially lift the UAV with the change in wing position in stage 702. In some embodiments, the motors may be turned on or sped up in stage 702 to cause the UAV to climb in altitude to reach stage 703. In stage 703, one motor is rotated downward and another motor is rotated backward while the wings are folded. The position of the motors and wings at stage 703 may be configured to cause the UAV to again dip in altitude. With the flight pattern shown in FIG. 7, motors may be turned off or slowed down during portions of the flight to conserve energy. In some embodiments, the flight pattern shown in FIG. 7 may be configured to mimic the flight pattern of a predatory bird (e.g. hawk, eagle, etc.) to scare away pests such as field mice and insects.

The flight pattern and UAV wing and motor positions shown in FIG. 7 are provided as examples only and may not reflect an actual UAV flight. In addition to the wing and motor positions of the UAV, the flight pattern of the UAV may be affect by various environmental conditions such as wind speed, wind direction, air pressure, precipitation, weather condition, ground condition, presence of one or more other aerial vehicles, etc.

Figure 8:
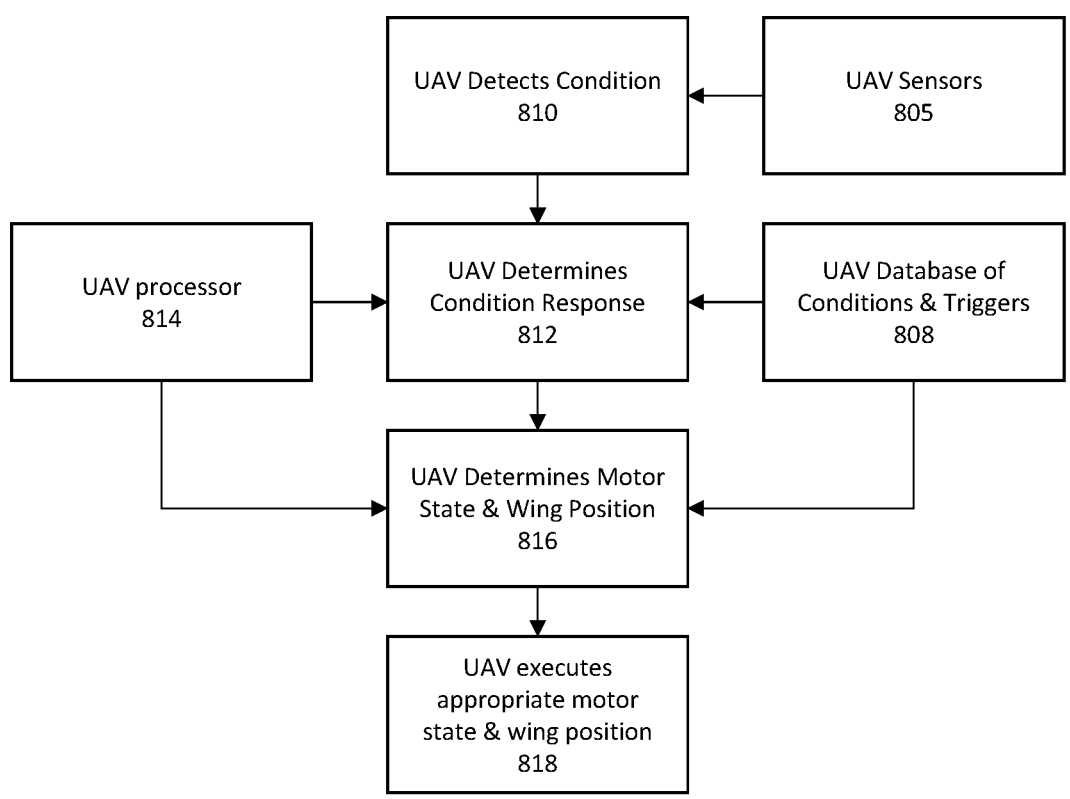
FIG. 8 is a flow diagram in accordance with several embodiments.

Referring now to FIG. 8, a process for UAV flight pattern control is shown. In step 810, the UAV detects flight condition using UAV sensors 805. In some embodiments, UAV sensor 805 may comprise one or more of a center of gravity sensor, a barometric pressure sensor, a wind speed sensor, and a vehicle speed sensor. In some embodiments, step 810 may further be based on data collected by external sensors such as weather data provided by a weather service.

In step 812, the UAV determines a response to the detected condition. The response may be determined with algorithms executed by the UAV's processor 814 using information stored in the conditions and triggers database 808. In some embodiments, the conditions and triggers database may correlate sets of condition parameters (e.g. wind direction, wind speed, altitude, etc.) to predefined responses (e.g. tilt wing, adjust motor). In step 816, the UAV determines the motor state and wing position using the UAV 814 and based on the conditions and trigger database 808. In step 818, the UAV executes the appropriate motor state and wing position. In some embodiments, the process returns to 810 after step 818 and the motors and wings of the UAV is continuously adjusted during flight.

Figure 9:
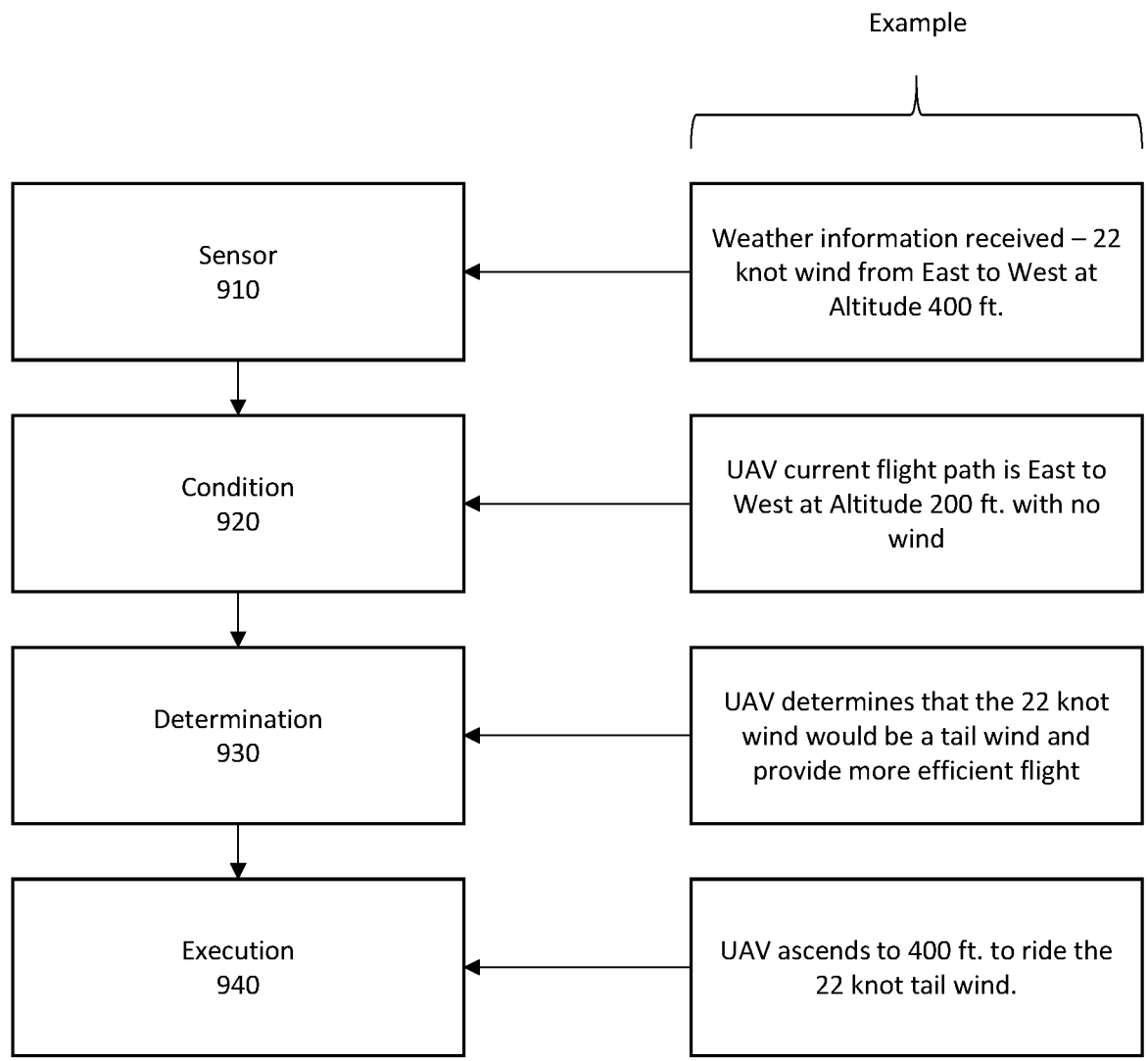
FIG. 9 is a flow diagram in accordance with several embodiments.

Referring now to FIG. 9, an example process of a UAV flight is provided. First, the sensor 920 collects flight condition information. For example, the UAV may receive weather information indicating that at the altitude of 400 ft, the wind condition is 22 knots east to west. The system may further determine other conditions 910 such as flight status. For example, the UAV may determine that its current flight path is east to west at an altitude of 200 ft with no significant wind. The UAV may then make a determination 930 based on the sensor data and flight status information. For example, the UAV may determine that a 22-knot wind tailwind would increase flight efficiency. The UAV may then execute 940 a flight pattern change based on the determination. For example, the UAV may begin an ascent to 400 ft. to ride the 22-knot tail wind.

In some embodiments, UAV energy optimization may include the use of electromagnetic induction by way of radio frequency communication. In some embodiments, wind speed and direction may be determined based on sensors integrated onto various devices covering the area that the UAV is operating in. In some embodiments, the range of a UAV's may be extended using wind speed and other environmental data to better anticipate adjustments to its flight pattern.

In some embodiments, a UAV may be configured to mimics bird flight. For example, the UAV may be configured to soar, dive, and then climb in altitude using the acceleration from the dive. In some embodiments, the UAV may be configured to fly in a continuous cycle of diving and accelerating. In some embodiments, retractable wings of a UAV may be configured to flap with vertical movement to increase altitude and speed. In some embodiments, the rotational wings of a UAV may be configured to adjust wing rotation based on wind condition. In some embodiments, a UAV may comprise a tail for stabilizing vertical flight. In some embodiments, one or more motors of a UAV may be configured to rotate and/or tilt to affect the speed and direction of the UAV.

Non-limiting examples of tasks that may be carried out by UAVs and functionalities of UAVs are provided herein. In some embodiments, a UAV may be configured to dock with one or more of a field equipment, an autonomous vehicle, a stationary docking station, and a moving vehicle or equipment. In some embodiments, the system may use the parameters of a task to determine whether to perform the task while stationary, docked, moving, and/or undocked. In some embodiments, a task profile may specify an accuracy of the task and the system may determine whether the accuracy could be achieved while the UAV is docked or undocked. In some embodiments, the system may consider the optimization of one or more of the UAV, field equipment, and sensors in completing a task. In some embodiments, the system may consider the window of opportunity for performing the task. For example, a UAV assigned to perform night scouting may require the UAV to fly in a scouting pattern during a set period of time. In some embodiments, the system may consider whether to station the UAV based on energy efficiency. For example, the system may consider whether there is equipment in the field that can carry the UAV around while the UAV performs the assigned task. In some embodiments, the system may assess the risk that the task presents to the UAV, equipment, or persons in the field. For example, in high winds or high rains, the system may cause the UAV to dock at a station and complete the tasks from a fixed location. In some embodiments, the risks associated with given tasks and environment may be weighted heavily in the consideration as compared to other parameters and requirements.

In some embodiments, the decision making for the UAV may be logic dynamic and localized. For example, a UAV may be configured to make decisions in the field with logical values already defined. In some embodiments, UAVs may further be configured to assign tasks to field equipment. In some embodiments, UAVs may be configured to make decisions based on their existing missions and data received from sensors and/or a remote data source.

In some embodiments, a decision-making system may use tasks assigned to a UAV, including rules and parameters, to determine whether to dock, undock, or fly the UAV. In some embodiments, the system may consider sensor data, required equipment, task criterion, fuel level, system optimization, equipment optimization, task optimization, and field optimization in the decision making. In some embodiments, a UAV may be configured to mission plan and making changes to equipment's missions while it is docked.

In some embodiments, a UAV may be configured to use the docking station for data processing, data storage, communication with equipment, refueling, retooling, etc. In some embodiments, a UAV may use the docking station to process the data received from its own sensors and/or the sensors on other equipment. In some embodiments, a UAV may be configured to use the docking station to store the data. In some embodiments, a UAV may be configured to use the docking station to communicate with other equipment in the field, a central computer system, and/or one or more persons operating or working with the system. In some embodiments, a UAV may use the docking station to retool its integrated devices, such as removing/adding modular adapters for various sensors. In some embodiments, sensors may include soil monitors, weather monitors, pest monitors, etc. In some embodiments, the system may comprise modular sensors configured to be dropped from the UAV, and monitor the given area via ongoing active communication, and then picked up by the UAV. In some embodiments, a UAV may replenish its power source at the docking station through one or more electromagnetic induction, automated battery swapping, plug-and-play recharging, radio frequency induction, etc.

In some embodiments, a UAV may be configured perform a variety of tasks while landed. In some embodiments, a UAV may be configured to collect information and data from a onboard sensor, remote sensors, and other equipment. In some embodiments, a UAV may be configured to exchange data with a docking station. In some embodiments, a UAV may perform visual analysis using its own visual system or other equipment. In some embodiments, a UAV may process data using an onboard data processors and/or a data processor of the docking stations.

In some embodiments, if a UAV is docked on a given piece of equipment, the UAV may be configured to function as a diagnostic tool for the equipment. In some embodiments, a UAV may transmit equipment errors to a central computer system, an operator, a docking station, or other equipment. In some embodiments, a UAV may be configured to perform repair service on the equipment based on the detected errors.

In some embodiments, a system tracks and manages the seed to sale process of fresh produce. The process may start from seed, to growth, to harvest, to long distance transport, to last-mile transport, to point of sale, including storage points along the way ranging from bulk stores and store shelves. Efficient management of such process may get fresh produce to a buyer at a point of sale with ample return from investment and increase customer satisfaction. In some embodiments, the system may be configured to use UAVs and other sensor data for risk reduction. In some cases, the greatest risk of investment corresponds to when a farmer plants a seed and the least risk occurs at the point of sale when a customer has the fresh produce in hand. In some embodiments, UAV data may be analyzed along with other data to reduce the risk. For example, a UAV may be used to determine optimal planting conditions weighed against the optimal window for planting in the region—a period of high uncertainty. In another example, a UAV may be used to determine optimal harvest times weighed against near-term weather—a period of lower uncertainty. In some embodiments, data used for system management may be repurposed in the futures markets to further offset risks.

In some embodiments, reducing risks at different stages of the seed to sale process allows algorithms to give freshness-at-an-ample-margin a higher priority than simple efficient logistics. Having a higher percentage of produce successfully grown reach customers can offset the marginally higher cost of implementing the system. The costs may further be reduced by the higher number of satisfied customers that return to their point of sale. Transport and storage cost may also be calculated to increase the efficiency of the system.

With the system, the risk of loss from seed to sale may track downward as each hurdle (risk generating event) is successfully crossed. In some embodiments, UAV data may be used to flag whenever the risk tracks the wrong way. For example, oversupply that could lead to produce spoilage could be offset by an adjustment elsewhere in the system. In another example, the system may detect that a region needs more transport capacity to move the expected volume of harvest faster. In some embodiments, with the system, UAV or other sensors may make the system more efficient. Additionally, uncertainties may be identified and/or reduced to increase the odds of successfully going from seed to sale and gaining a satisfied customer that returns for purchases.

In some embodiments, a UAV may be configured to perform cross-purpose transport. For example, the system may anticipate needs such as fertilizers, and optimize the use of the UAV's transport capacity both ways. In some embodiments, the docking stations may comprise solar panel with autonomous UAV hookup on rooftops for near-autonomous off-the-grid functioning of UAVs. In some embodiments, a docking station may include retractable cover for sheltering UAVs from the weather. In some embodiments, a UAV and/or a docking station may comprise an autonomous system status checker that updates when asked or when a problem is detected.

In some embodiments, a UAV may be configured to leapfrog docking station chains to increase the coverage area of a single UAV. In some embodiments, the system may include rescue UAVs configured to recover other malfunctioned UAVs. In some embodiments, a UAV may comprise retractable "hawk wings" to leverage wind or thermals energy from fields for extended flying time and/or to leverage the wind for more efficient flight.

In some embodiments, a UAV may function as a "scarecrow" by producing animal deterring sounds. In some embodiments, a UAV may be configured to chasing birds away from the field. In some embodiments, a UAV may be configured to scare birds or repel insects using compressed air (via noise or air-pressure). In some embodiments, a UAV may be configured to recognize birds visually and take action to deter birds accordingly. In some embodiments, a UAV may be shaped like a hawk to scare away birds. In some embodiments, a UAV may comprise a sensor (e.g. radar) to detect birds approaching from a distance. In some embodiments, one or more UAVs may be configured to herd animals away from crops.

In some embodiments, a UAV may be configured to function as a targeted pollinator. In some embodiments, a UAV may comprise a precise automated navigation system, a mapping sensor, altitude control, and a pollen dispenser. In some embodiments, the pollen dispenser may use inkjet technology for dispensing pollen. In some embodiments, a UAV may drag a refillable pad or a light weight brush across flowers to aid in pollination. In some embodiments, the UAV may comprise a squirt gun configured to perform binding application targeted at flowers. In some embodiments, the UAV may be configured to automatically refill the pollen application. In some embodiments, a UAV may be configured to carry a tank of pollen on the UAV to supply the dispenser. In some embodiments, the pollen application may comprise indicators to identify whether a flower has been pollinated. For example, the indicators may be read similar to a radar scan and detected as hot spots. In some embodiments, pollen application may be detected based on visual analytics. In some embodiments, a combination of pollen and an agent (e.g. dye, chip) may be used to identify if the pollen has reached the flowers. In some embodiments, a UAV may comprise a sky-crane to lower the pollinator device(s) and may hover above the plants and not downwash on flowers. In some embodiments, the UAVs may comprise lighter than air hybrid UAV for stationary or slow moving operations such as 24/7 monitoring. In some embodiments, a UAV may be configured to perform post pollination quality checks based on image analysis. In some embodiments, the system may optimize the timing of pollination to avoid other sources of pollen and cross contamination.

In some embodiments, a UAV may comprise a precision insecticide dispenser. In some embodiments, a UAV may be call in when insects are detected in a field or in adjacent fields before they arrive in the home field. In some embodiments, the system may increase the efficiency and reduce the cost large scale organic farming. In some embodiments, the system may also reduce the effects of pesticides on the environment.

In some embodiments, the system may comprise air analyzers for detecting the presence of insects and/or pest animals (e.g. ground hog) based on bug expiration and/or odor of droppings. In some embodiments, a solar panel docking stations may create a perimeter around the farms to monitor the entire field as well as the air above it. In some embodiments, UAVs and other devices may function as a surrogate for the fence line and use a wireless connection (e.g. Wi-Fi) for sharing information. In some embodiments, the system may be configured to detect and identify pest profiles on leaves, stalks, etc. In some embodiments, the system may use audio data to identify pests.

In some embodiments, a solar panel may be added to an airship type UAVs for constant refueling and multi-use/purpose. In some embodiments, a UAV, a docking station, and/or a solar panel of the docking station may comprise a bug zapper curtain and/or may target pests on the fly. In some embodiments, a UAV, a docking station, and/or a solar panel may comprise an attractive agent to herd bugs and eliminate pests. In some embodiments, bodies of dead pests may be used for food for livestock and/or fertilizer.

In some embodiments, UAVs may comprise wings for gliding. In some embodiments, UAVs may comprise solar panels for longer flight time. In some embodiments, the system may comprise modularized sensor units configured to be attached to different types of vehicles. In some embodiments, sensor units may be removable from UAVs to reduce the weight of the UAV. In some embodiments, UAVs may be configured to have modules autonomously attached, removed, and/or reconfigured at a tooling station. In some embodiments, UAVs may comprise modularized receptor for various sensor configurations. In some embodiments, a UAV may comprise a retractable soil, weather, or water monitoring device. In some embodiments, a monitoring device may be attached to the UAV or may be configured to be shot into the soil and separated from the UAV.

In some embodiments, UAVs may be configured to handle some monitoring functions that do not require flight (e.g. weather monitoring) from the ground and/or a docking station. In some embodiments, UAVs may be configured to simultaneously monitor an area and gather of data in parallel. In some embodiments, soil, weather, and other types of conditions may be monitored at the same time. In some embodiments, a UAV and/or a docking station may perform topographical analysis to provide an accurate starting point for the delta. In some embodiments, a UAV may be configured to detect if a specific portion of an agricultural plot needs to be harvested. In some embodiments, a UAV may be used to slow the progression of a part of a plot. In some embodiments, field information may be relayed back to a central computer system and/or an operator, and farm vehicles may be directed to the location for harvesting.

In some embodiments, UAVs, whether stationed or in flight, may function as waypoints for other vehicles. In some embodiments, the system may comprise fixed nodes in the fields that can act as monitors and also relay information (e.g. location assistance) to the UAVs and other types of equipment. In some embodiments, UAVs may function as scouts in assisting workers who are harvesting or planting. In some embodiments, a UAV may be configured to detect weeds in a plot based on image analysis. In some embodiments, a UAV may be configured to dock with and/or undock from a tractor moving in the field.

In some embodiments, the system may be configured to optimize flight patterns by time and altitude for different monitoring functions. In some embodiments, a UAV may comprise retractable sails to optimize efficiency in vertical wind conditions.

In some embodiments, the system may perform bird identification and adjust its abilities based on those identifications. In some embodiments, animals may be identified based on trackers. In some embodiments, a UAV may be configured to remove the animal or pest from the field. In some embodiments, a UAV may use radar or detect for pests. In some embodiments, a UAV may proactively deter pests and/or use of weaponized devices (e.g. nets, pesticide, sprayer, cartage system, etc.) to combat pests and animals. In some embodiments, UAVs may be configured to herd and/or shepherd animals. In some embodiments, a UAV may be configured to interact with dogs and/or workers to assist in herding.

In some embodiments, a UAV may employ military-style silence technology to reduce the noise made by the UAV and allows for night UAV operations. In some embodiments, UAVs may be configured to produce audio or digital signal to notify customers of its arrival. In some embodiments, UAVs may function as before-the-first responder UAV in energy situations delivering such items as defibrillators and instructions when time is supercritical. In some embodiments, a UAV may provide first responders with an early video of the scene before responders arrive. In some embodiments, such UAVs may be pre-positioned well forward of first responder bases to respond to emergency situations.

In some embodiments, a functioning UAV that is somehow cut off between delivery and retrieval may be configured to hover at a fixed location and a fixed altitude (e.g. 7 feet) until retrieved. In some embodiments, a UAV may be equipped with dog deterring whistle. In some embodiments, UAVs may be configured to transport cross-inventory exchange between stores. In some embodiments, UAVs may comprise detachable rotors and motors that can be easily replaced in the field. In some embodiments, the system may send a verification ping to a smartphone to ensure someone is standing by for a delivery before a delivery UAV is launched.

In some embodiments, UAVs may use highways as path guidance as almost all delivery locations would have access to roads, people are used to items on roads making noise, roads a generally clear of obstacles spare some tunnels and city underpasses, and roads provides a unique fingerprint to find locations.

In some embodiments, UAVs may function as predator-deterring sentry units. In some embodiments, UAVs may tracks emitters from government collared predators (e.g. wolves and mountain lions) in national and state parks near farmland areas. In some embodiments, UAVs may be configured to UAV chases off predators that come too close using high-frequency whistles to reduce conflicts between farmer and predator animals. In some embodiments, UAVs may be configured to shepherd farm animals.

In some embodiments, UAVs may be configured for loss prevention in stores. In some embodiments, one or more UAVs may be hangs from above a store entryway. If a shoplifter leaves the store with a security-detected item, the UAV may drops from the roof and follow the shoplifter from about twelve feet up, flashing lights and taking video. In some embodiments, a customer may receive a warning that they are carrying a security-detected item before they step out the door.

In some embodiments, UAVs may be configured to escort customers out to their vehicle with lights and/or video recording. In some embodiments, the functions the system may be integrated into a shopping cart and/or a personal assistance device.

In some embodiments, UAVs may be configured to drop items (e.g. packages, sensors) via parachutes. In some embodiments, UAVs may be used to deploy fertilizers, determine yields for farmers, and forecast harvest to anticipate the needs for transport and provide accurate sourcing to different facilities within the supply chain to minimize the discounting of produce and increase even distribution of products In some embodiments, the system may comprise solar panel docking stations throughout a field so UAVs can charge while surveilling the field. In some embodiments, docking stations may comprise sensors for detecting one or more of moisture, sunlight, rainfall, temperature, etc.

In some embodiments, UAVs may be configured to deploy supplies to farmers in the field. In some embodiments, UAVs may be used to survey potential crop plots and analyze the ground beneath to increase crop plot usage efficiency. In some embodiments, UAVs may be configured to monitor and record human activity in the field. In some embodiments, UAVs may include visual analytic sensors configured to detect abnormal activity in the field from one or more of humans, pets, and animals. In some embodiments, UAVs may be configured to deploy water. In some embodiments, UAVs may be configured to follow farm workers during harvesting to optimize harvest/plant route planning. In some embodiments, UAVs may transmit a route plan to workers that analyzes the worker's position and the harvest/plant route line to provide workers with an efficient crop harvesting and planting management plan.

In some embodiments, when a UAV loses connection or fails while operating, the UAV may deploy a parachute for landing. In some embodiments, a UAV parachute may be configured pulled back into the parachute housing at the top of the UAV. In some embodiments, the parachute may wrap around the UAV, including the propellers, and remain tight with tension by gear or other mechanism. In some embodiments, a failed UAV may transmit a homing beacon to a central computer or a docking station and sit wrapped and secured until help arrives.

In some embodiments, UAVs may be configured to track marine wildlife. In some embodiments, sizes, paths, and locations of marine wildlife may be tracked with UAVs. Information of marine life sighting may be relayed to officials in near real time. In some embodiments, UAVs may be configured to shoot RFID chips from the air and tag wildlife. In some embodiments, UAVs may further monitor shorelines and boating paths. In some embodiments, UAVs may also detect for swimmers in distress. In some embodiments, UAVs may include flexible wings that may adjust to wind streams, much like sailboats. In some embodiments, UAVs may further monitors for drug trafficking, perform search and rescue, and/or provide lifeguard services. In some embodiments, a UAV may be configured to deploy a parachute and/or a raft when it fails over water or land to reduce the damage sustained from impact.

In some embodiments, UAVs may be used to track containers waiting for customs processing in a port area to detect for congestions at the port and get early formation for potential impacts on resources and supply chain. In some embodiments, UAVs may be used to conduct temperature management for the containers and/or monitor the cold chain/chilled chain.

In some embodiments, UAVs may be used to check that a fence around the property is not damaged. In some embodiments, UAVs may be used to check on the well-being of the animals, such as cattle, horses. In some embodiments, a UAV may be configured to detect that another UAV is deliberately attempting to fly into it and maneuver to avoid damage. In some embodiments, a UAV may be configured to time the application fertilizer to control the peak harvest time based on the expected peak price for the commodity.

In one embodiment, a system for unmanned flight comprises a set of motors configured to provide locomotion to an unmanned aerial vehicle, a set of wings coupled to a body of the unmanned aerial vehicle via an actuator and configured to move relative to the body of the unmanned aerial vehicle, a sensor system on the unmanned aerial vehicle, and a control circuit coupled to the sensor system. The control circuit being configured to: retrieve a task profile for a task assigned to the unmanned aerial vehicle, cause the set of motors to lift the unmanned aerial vehicle, detect condition parameters of the unmanned aerial vehicle based on the sensor system, determine a position for the set of wings based on the task profile and the condition parameters, and cause the actuator to move the set of wings to the wing position while the unmanned aerial vehicle is in flight.

In one embodiment, a method for unmanned flight comprises retrieving a task profile for a task assigned to an unmanned aerial vehicle comprising: a set of motors configured to provide locomotion to the unmanned aerial vehicle, a set of wings coupled to a body of the unmanned aerial vehicle via an actuator and configured to move relative to the body of the unmanned aerial vehicle, and a sensor system, causing the set of motors to lift the unmanned aerial vehicle, detecting condition parameters of the unmanned aerial vehicle based on the sensor system, determining, with a control circuit, a wing position for the set of wings based on the task profile and the condition parameters, and causing the actuator to move the set of wings to the wing position while the unmanned aerial vehicle is in flight.

In one embodiment, an apparatus for controlling unmanned flight, comprises a non-transitory storage medium storing a set of computer readable instructions, and a control circuit configured to execute the set of computer readable instructions which causes to the control circuit to: retrieve a task profile for a task assigned to an unmanned aerial vehicle comprising: a set of motors configured to provide locomotion to the unmanned aerial vehicle, a set of wings coupled to a body of the unmanned aerial vehicle via an actuator and configured to rotate relative to the body of the unmanned aerial vehicle, and a sensor system, cause the set of motors to lift the unmanned aerial vehicle, detect condition parameters of the unmanned aerial vehicle based on the sensor system, determine a wing position for the set of wings based on the task profile and the condition parameters, and cause the actuator to move the set of wings to the wing position while the unmanned aerial vehicle is in flight.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for unmanned vehicle flight pattern control comprising:
    a set of motors configured to provide locomotion to an unmanned aerial vehicle;
    a set of wings coupled to a body of the unmanned aerial vehicle via an actuator and configured to move relative to the body of the unmanned aerial vehicle;
    a sensor system on the unmanned aerial vehicle; and
    a control circuit coupled to the sensor system, the control circuit being configured to:
        cause the set of motors to lift the unmanned aerial vehicle;
        detect condition parameters of the unmanned aerial vehicle based on the sensor system;
        determine a position for the set of wings based on the condition parameters; and
        cause the actuator to move the set of wings to the wing position while the unmanned aerial vehicle is in flight;
        wherein the wing position is determined based on minimizing power consumption of the unmanned aerial vehicle under the condition parameters.

2. The system of claim 1, wherein the set of wings are configured to rotate about an axis that is perpendicular to the body of the unmanned aerial vehicle via the actuator and the wing position comprises a wing rotation angle.

3. The system of claim 1, wherein the wing position comprises one or more of an extended position, partially extended position, or a retracted position.

4. The system of claim 1, wherein the set of wings comprises one or more flexible membrane supported by a frame structure coupled to the actuator.

5. The system of claim 1, wherein the set of motors are configured to rotate relative to the body of the unmanned aerial vehicle to an angle determine based on the condition parameters.

6. The system of claim 1, wherein the control circuit is further configured to turn off one or more motors in the set of motors based on the condition parameters.

7. The system of claim 1, wherein the unmanned aerial vehicle further comprises one or more of a tail and a sail coupled to the body of the unmanned aerial vehicle and configured provide stability to the unmanned aerial vehicle.

8. The system of claim 1, wherein the condition parameters are further determined based on information received from one or more of: a stationary sensor, a weather reporting service, an air traffic control signal, or one or more other aerial vehicles.

9. The system of claim 1, wherein the condition parameters comprises one or more of: wind speed, wind direction, air pressure, visibility, lighting condition, precipitation, weather condition, ground condition, distance to a charging station, or locations of one or more other aerial vehicles.

10. A method for unmanned vehicle flight pattern control comprising:
    controlling an unmanned aerial vehicle comprising:
        a set of motors configured to provide locomotion to the unmanned aerial vehicle;
        a set of wings coupled to a body of the unmanned aerial vehicle via an actuator and configured to move relative to the body of the unmanned aerial vehicle; and
    a sensor system;
    causing the set of motors to lift the unmanned aerial vehicle;
    detecting condition parameters of the unmanned aerial vehicle based on the sensor system;
    determining, with a control circuit, a wing position for the set of wings based on the condition parameters; and
    causing the actuator to move the set of wings to the wing position while the unmanned aerial vehicle is in flight
    wherein the wing position is determined based on minimizing power consumption of the unmanned aerial vehicle under the condition parameters.

11. The method of claim 10, wherein the set of wings are configured to rotate about an axis that is perpendicular to the body of the unmanned aerial vehicle and the wing position comprises a wing rotation angle.

12. The method of claim 10, wherein the wing position comprises one or more of an extended position, partially extended position, or a retracted position.

13. The method of claim 10, wherein the set of wings comprises one or more flexible membranes supported by a frame structure.

14. The method of claim 10, wherein the set of motors are configured to rotate relative to the body of the unmanned aerial vehicle to an angle determine based on the condition parameters.

15. The method of claim 10, further comprising:
    turning off one or more motors in the set of motors based the condition parameters.

16. The method of claim 10, wherein the unmanned aerial vehicle further comprises one or more of a tail and a sail coupled to the body of the unmanned aerial vehicle and configured provide stability to the unmanned aerial vehicle.

17. The method of claim 10, wherein the condition parameters are further determined based on information received from one or more of: a stationary sensor, a weather reporting service, an air traffic control signal, or one or more other aerial vehicles.

18. The method of claim 10, wherein the condition parameters comprises one or more of: wind speed, wind direction, air pressure, visibility, lighting condition, precipitation, weather condition, ground condition, distance to a charging station, or locations of one or more other aerial vehicles.

19. An apparatus for unmanned vehicle flight pattern control, comprising:
    a non-transitory storage medium storing a set of computer readable instructions; and a control circuit configured to execute the set of computer readable instructions which causes to the control circuit to:

controlling an unmanned aerial vehicle comprising:
- a set of motors configured to provide locomotion to the unmanned aerial vehicle;
- a set of wings coupled to a body of the unmanned aerial vehicle via an actuator and configured to rotate relative to the body of the unmanned aerial vehicle; and
- a sensor system;

cause the set of motors to lift the unmanned aerial vehicle;

detect condition parameters of the unmanned aerial vehicle based on the sensor system;

determine a wing position for the set of wings based on the condition parameters; and cause the actuator to move the set of wings to the wing position while the unmanned aerial vehicle is in flight;

wherein the wing position is determined based on minimizing power consumption of the unmanned aerial vehicle under the condition parameters.

\* \* \* \* \*

UNITED STATES PATENT AND TRADEMARK OFFICE
CERTIFICATE OF CORRECTION

PATENT NO. : 11,117,663 B2
APPLICATION NO. : 16/352694
DATED : September 14, 2021
INVENTOR(S) : Robert L. Cantrell et al.

It is certified that error appears in the above-identified patent and that said Letters Patent is hereby corrected as shown below:

In the Claims

In Claim 7, Column 23, Line 62, after "configured" insert -- to --
In Claim 10, Column 24, Line 25, after "flight" insert -- ; --
In Claim 16, Column 24, Line 51, after "configured" insert -- to --
In Claim 19, Column 25, Line 4, delete "controlling" insert -- control --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*